(12) United States Patent
Fujiwara

(10) Patent No.: US 10,481,778 B2
(45) Date of Patent: Nov. 19, 2019

(54) DISPLAY DEVICE

(71) Applicant: KYOCERA Document Solutions Inc., Osaka (JP)

(72) Inventor: Yoshiyuki Fujiwara, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/873,938

(22) Filed: Jan. 18, 2018

(65) Prior Publication Data
US 2018/0217741 A1 Aug. 2, 2018

(30) Foreign Application Priority Data

Jan. 27, 2017 (JP) ................................ 2017-012880

(51) Int. Cl.
G06F 3/0484 (2013.01)
G06F 3/0482 (2013.01)
G06F 3/0488 (2013.01)

(52) U.S. Cl.
CPC ...... G06F 3/04845 (2013.01); G06F 3/04883 (2013.01)

(58) Field of Classification Search
CPC ............................ G06F 3/0488; G06F 3/04883
See application file for complete search history.

(56) References Cited

U.S. PATENT DOCUMENTS 9,346,358 B2 5/2016 Kinoshita et al.
2007/0152984 A1* 7/2007 Ording ................ G06F 3/04845
345/173
2009/0259967 A1* 10/2009 Davidson .............. G06F 3/0481
715/799
2011/0163968 A1* 7/2011 Hogan ................ G06F 3/04883
345/173
2012/0169774 A1* 7/2012 Yu ........................ G06F 3/04883
345/661

(Continued)

FOREIGN PATENT DOCUMENTS

JP 2011-053770 A 3/2011
JP 2013-222277 A 10/2013

(Continued)

OTHER PUBLICATIONS

An Office Action; "Notice of Reasons for Refusal," issued by the Japanese Patent Office dated Jun. 4, 2019, which corresponds to Japanese Patent Application No. 2017-012880 and is related to U.S. Appl. No. 15/873,938; with English language translation.

Primary Examiner — Rayeez R Chowdhury
(74) Attorney, Agent, or Firm — Studebaker & Brackett PC

(57) ABSTRACT

A display device includes a display, a detector, and a controller. The display has a display surface. The display displays an image. The detector is capable of detecting at least three touch positions each on the basis of a touch on the display surface by a detection target. The controller controls the display and the detector. The controller determines whether or not a pinch operation is performed on the basis of whether or not a distance between two touch positions touched last by the detection target is changed. When determining that the pinch operation is performed, the controller performs zoom-in processing or zoom-out processing on the image using a touch position touched immediately before the last touched two touch positions as a reference point.

7 Claims, 10 Drawing Sheets

(56) References Cited

U.S. PATENT DOCUMENTS

| | | | |
|---|---|---|---|
| 2013/0094593 A1* | 4/2013 | Huang | G06F 3/0488 375/240.26 |
| 2014/0035946 A1 | 2/2014 | Chang et al. | |
| 2014/0109044 A1* | 4/2014 | Cifra | G06F 3/04883 717/113 |
| 2015/0195789 A1* | 7/2015 | Yoon | G06F 3/0488 345/173 |
| 2015/0274016 A1 | 10/2015 | Kinoshita et al. | |
| 2016/0011737 A1* | 1/2016 | Kang | G06F 16/94 715/808 |

FOREIGN PATENT DOCUMENTS

| | | |
|---|---|---|
| JP | 2014-512602 A | 5/2014 |
| JP | 2014-182420 A | 9/2014 |
| JP | 2014-229002 A | 12/2014 |
| JP | 2015-49621 A | 3/2015 |
| JP | 2015-193280 A | 11/2015 |
| JP | 2016-146221 A | 8/2016 |
| WO | 2013/081819 A1 | 6/2013 |

* cited by examiner

DISPLAY DEVICE

INCORPORATION BY REFERENCE

The present application claims priority under 35 U.S.C. § 119 to Japanese Patent Application No. 2017-012880, filed on Jan. 27, 2017. The contents of this application are incorporated herein by reference in their entirety.

BACKGROUND

The present disclosure relates to a display device.

A known display device zooms in on or out from a displayed image in response to a pinch operation performed by a user. A mobile terminal zooms in on an image in response to a pinch-out operation performed by a user. Also, the mobile terminal zooms out from an image in response to a pinch-in operation performed by a user.

SUMMARY

A display device according to the present disclosure includes a display, a detector, and a controller. The display has a display surface. The display displays an image. The detector is capable of detecting at least three touch positions each on the basis of a touch on the display surface by a detection target. The controller controls the display and the detector. The controller determines whether or not a pinch operation is performed on the basis of whether or not a distance between two touch positions touched last by the detection target is changed. When determining that the pinch operation is performed, the controller performs zoom-in processing or zoom-out processing on the image using a touch position touched immediately before the last touched two touch positions as a reference point.

DETAILED DESCRIPTION

Figure 1:
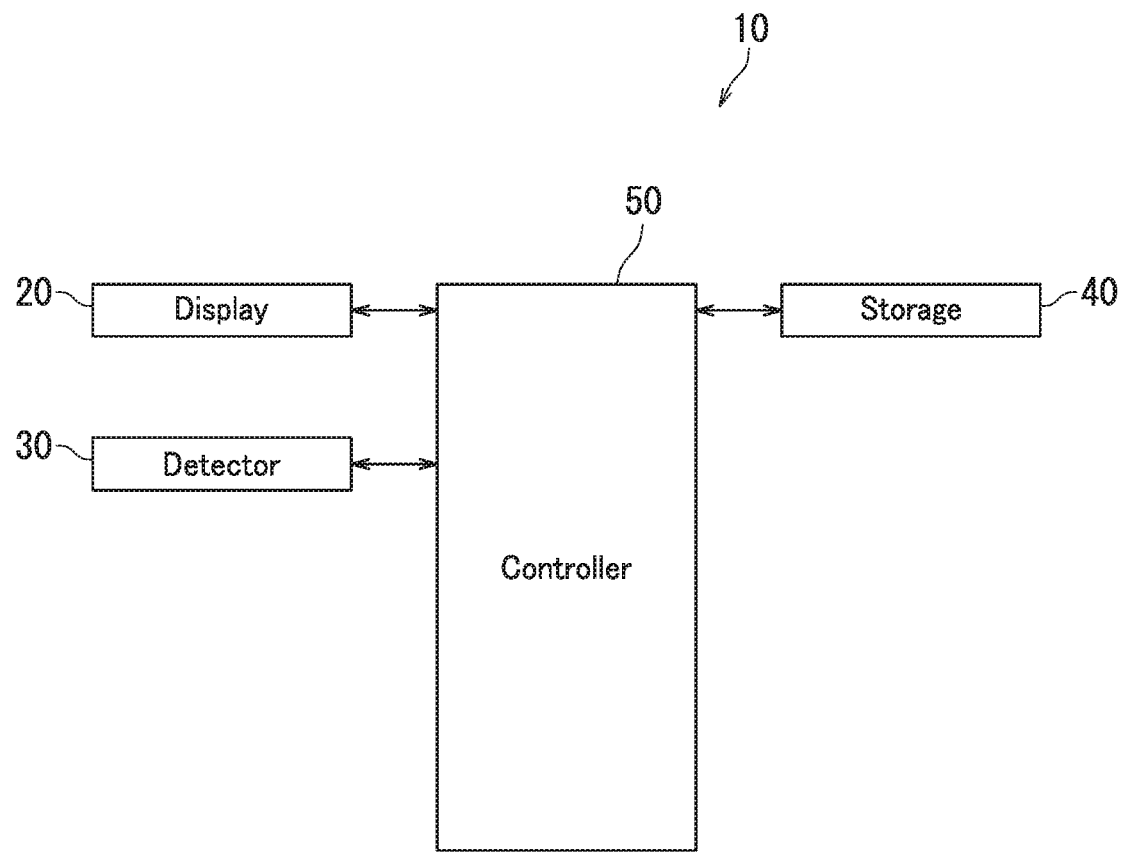
FIG. 1 is a block diagram illustrating a display device according to an embodiment of the present disclosure.

The following describes an embodiment of the present disclosure with reference to the drawings. In the drawings, elements that are the same or substantially equivalent are labelled using the same reference signs and explanation thereof will not be repeated.

Figure 2A:
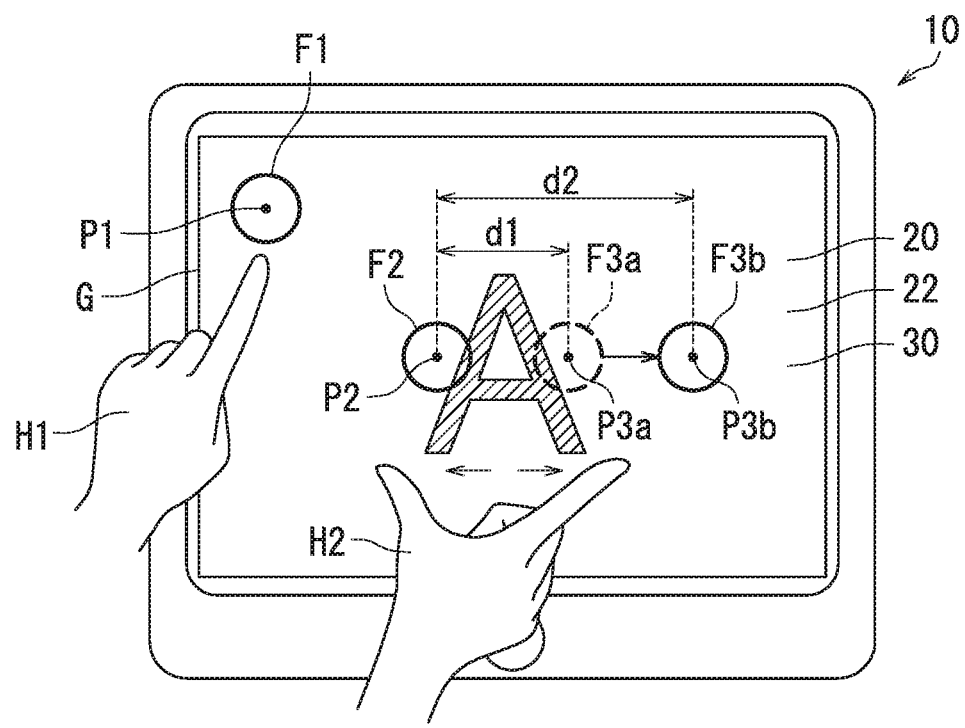
FIGS. 2A and 2B are schematic illustrations of the display device according to the embodiment of the present disclosure.
Figure 2B:
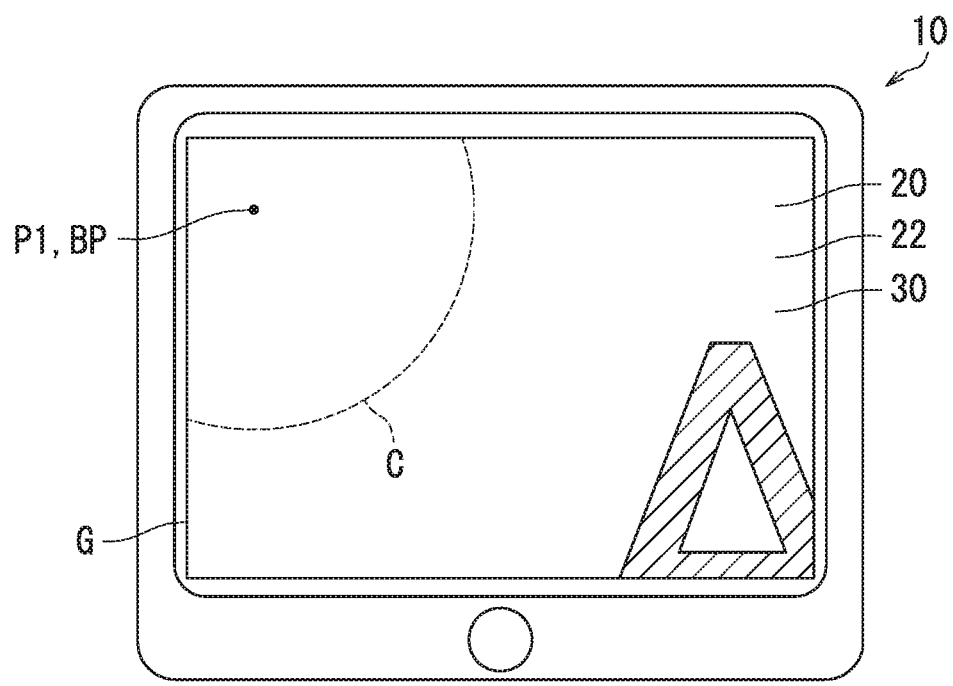

An embodiment of a display device 10 according to the present disclosure will be described with reference to FIGS. 1, 2A, and 2B. FIG. 1 is a block diagram illustrating the display device 10 according to the embodiment of the present disclosure. FIGS. 2A and 2B are schematic illustrations of the display device 10 according to the embodiment of the present disclosure. In FIG. 2A, a left hand H1 represents the left hand of a user operating the display device 10. A right hand H2 represents the right hand of the user operating the display device 10. Positions F1, F2, F3a, and F3b indicate positions on a display surface 22 touched by fingers of the user in a touch operation by the user. A first touch position P1, a second touch position P2, a third touch position P3a, and a third touch position P3b indicate touch positions detected by a detector 30. A distance d1 indicates a distance between the second touch position P2 and the third touch position P3a. A distance d2 indicates a distance between the second touch position P2 and the third touch position P3b. Note that in the present description, the first touch position P1, the second touch position P2, the third touch position P3a, and the third touch position P3b may each be referred to as a touch position P.

As illustrated in FIG. 1, the display device 10 includes a display 20, the detector 30, storage 40, and a controller 50. The display device 10 is for example a smartphone or a tablet computer.

As illustrated in FIGS. 2A and 2B, the display 20 has the display surface 22. The display 20 displays an image G. The image G in the present embodiment includes an image indicating a character A. The display 20 is for example a liquid crystal panel.

The detector 30 detects a touch position P on the basis of a touch on the display surface 22 by a detection target. The detector 30 is capable of detecting a plurality of touch positions P. The detector 30 is for example a touch sensor. The detection target is for example a finger of a user operating the display device 10, or a stylus. In the following description, the finger of the user operating the display device 10 will be described as an example of the detection target.

The storage 40 is for example a read only memory (ROM) device and a random access memory (RAM) device. The ROM device stores therein a control program.

The controller 50 controls the display 20, the detector 30, and the storage 40. The controller 50 is for example a central processing unit (CPU). The controller 50 determines whether or not a pinch operation is performed on the basis of whether or not a distance between two touch positions P2 and P3 touched last by the detection target among a plurality of touch positions P detected by the detector 30 is changed. The two touch positions touched last are, among the plurality of touch positions P detected by the detector 30 for example as of a time when the controller 50 determines whether or not the pinch operation is performed, the touch position P3 detected latest by the detector 30 and the touch position P2 detected second latest by the detector 30. When the controller 50 determines that the pinch operation is performed, zoom-in processing or zoom-out processing is performed on the image G using the touch position P1 touched immediately before the last touched two touch positions P2 and P3 as a reference point BP. Therefore, the user can specify the reference point BP for the zoom-in processing or the zoom-out processing by performing a touch operation before the pinch operation. Through the above, an area of the image G to be zoomed in on or out by the pinch operation can be easily specified.

Figure 3:
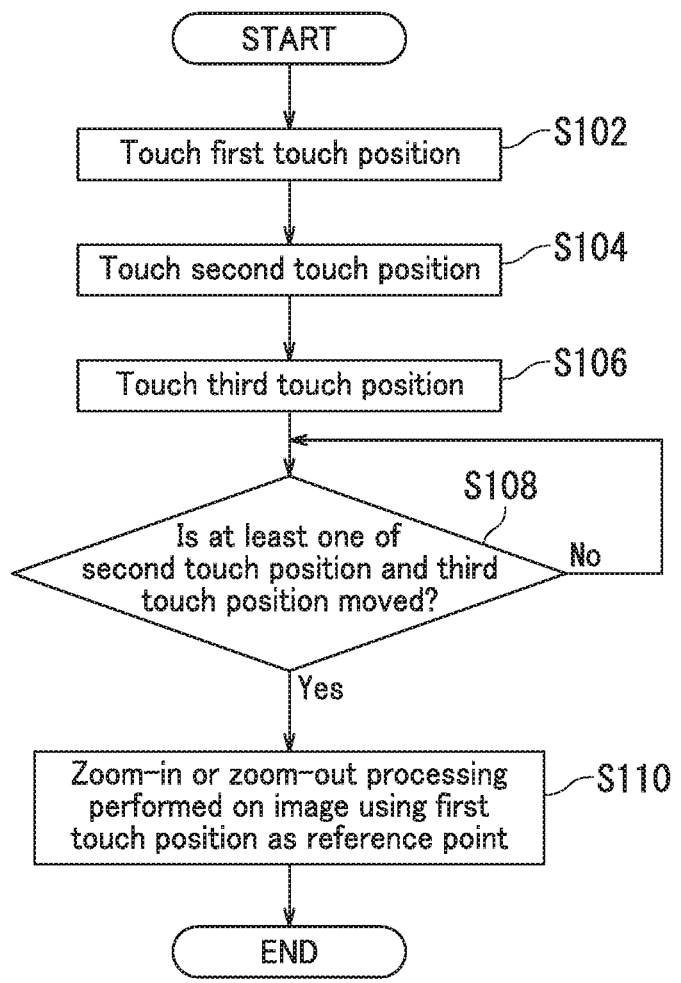
FIG. 3 is a flowchart illustrating a method for performing zoom-in processing or zoom-out processing on an image by the display device according to the embodiment of the present disclosure.

The following describes a method for performing the zoom-in processing or the zoom-out processing on the image G by the display device 10 according to the embodiment of the present disclosure, with reference to FIGS. 1 to 3. FIG. 3 is a flowchart illustrating the method for performing the zoom-in processing or the zoom-out processing on the image G by the display device 10 according to the embodiment of the present disclosure. The zoom-in processing or the zoom-out processing is performed on the image G through execution of processes at steps S102 to S110 illustrated in FIG. 3. The present embodiment describes the zoom-in processing performed on the image G.

At step S102, the user touches the first touch position P1. Specifically, the forefinger of the left hand H1 of the user touches the position F1 as illustrated in FIG. 2A. When the position F1 is touched, the detector 30 detects the first touch position P1. The processing proceeds to step S104.

At step S104, the user touches the second touch position P2. Specifically, the thumb of the right hand H2 of the user touches the position F2 as illustrated in FIG. 2A. When the position F2 is touched, the detector 30 detects the second touch position P2. The processing proceeds to step S106.

At step S106, the user touches the third touch position P3. Specifically, the forefinger of the right hand H2 of the user touches the position F3a as illustrated in FIG. 2A. When the position F3a is touched, the detector 30 detects the third touch position P3a. The processing proceeds to step S108.

At step S108, the controller 50 determines whether or not at least one of the second touch position P2 and the third touch position P3 is moved. Specifically, the controller 50 determines whether or not at least one of the thumb and the forefinger of the right hand H2 of the user is moved. More specifically, the controller 50 determines whether or not a distance between the second touch position P2 and the third touch position P3 is changed. When the controller 50 determines that neither the second touch position P2 nor the third touch position P3 is moved (No at step S108), that is, when the controller 50 determines that the pinch operation is not performed by the user, the processing returns to step S108. When the controller 50 determines that at least one of the second touch position P2 and the third touch position P3 is moved (Yes at step S108), that is, when the controller 50 determines that the pinch operation is performed by the user, the processing proceeds to step S110. For example, in a situation in which the forefinger of the right hand H2 of the user is moved from the position F3a to the position F3b as illustrated in FIG. 2A, the distance between the second touch position P2 and the third touch position P3 (P3a, P3b) changes from the distance d1 to the distance d2. Therefore, the controller 50 determines that the pinch operation is performed by the user (Yes at step S108), and the processing proceeds to step S110.

At step S110, the controller 50 performs the zoom-in processing or the zoom-out processing on the image G using the first touch position P1 as the reference point BP. Specifically, the zoom-in processing is performed using the first touch position P1 as the reference point BP, as illustrated in FIG. 2B. In the present embodiment, the zoom-in processing or the zoom-out processing is performed on the image G using the first touch position P1 as a center. That is, the zoom-in processing or the zoom-out processing is performed such that the first touch position P1 serves as the center of an imaginary circle C. The imaginary circle C is an image indicating a magnification rate and a zoom-in direction of the zoom-in processing. In the present embodiment, the zoom-in processing is performed such that the first touch position P1 serves as the center of the imaginary circle C. Through the above, the processing ends.

As described above with reference to FIGS. 1 to 3, the controller 50 of the display device 10 determines whether or not the pinch operation is performed on the basis of whether or not a distance between two touch positions (the second touch position P2 and the third touch position P3) touched last by the detection target is changed. When the controller 50 determines that the pinch operation is performed, the zoom-in processing or the zoom-out processing is performed on the image G using a touch position (the first touch position P1) touched immediately before the last touched two touch positions (the second touch position P2 and the third touch position P3) as the reference point BP. Therefore, the user can specify the reference point BP for the zoom-in processing or the zoom-out processing by performing a touch operation before the pinch operation. Through the above, an area of the image G to be zoomed in on or out by the pinch operation can be easily specified.

Also, in a situation in which the detector 30 continues detecting a touch by the detection target on the touch position (the first touch position P1) touched immediately before the last touched two touch positions when the controller 50 determines that the pinch operation is performed, the controller 50 performs the zoom-in processing or the zoom-out processing on the image G using the touch position (the first touch position P1) touched immediately before the last touched two touch positions as the reference point BP. That is, when the user performs the pinch operation on the positions F2 and F3a while continuing to touch the position F1, the controller 50 performs the zoom-in processing or the zoom-out processing on the image G using the first touch position P1 as the reference point BP. By contrast, in a situation in which the detector 30 does not detect a touch by the detection target on the touch position (the first touch position P1) touched immediately before the last touched two touch positions, the controller 50 does not perform the zoom-in processing or the zoom-out processing on the image G using the touch position (the first touch position P1) as the reference point BP. Since the zoom-in processing or the zoom-out processing is performed on the image G in response to the pinch operation performed by the user while touching the reference point BP, the position of the reference point BP for the zoom-in processing or the zoom-out processing to be performed on the image G can be easily recognized. Therefore, an area of the image G to be zoomed in or out by the pinch operation can be easily specified.

The display device 10 described above with reference to FIGS. 1 to 3 zooms in on or out from the image G in response to the user performing the pinch operation while touching the reference point BP. However, the user may remove the finger from the reference point BP when performing the pinch operation. That is, the zoom-in processing or the zoom-out processing may be performed on the image G using the touch position (the first touch position P1) touched immediately before the last touched two touch positions as the reference point BP in both a situation in which the detector 30 continues detecting the touch by the detection target on the touch position (the first touch position P1) touched immediately before the last touched two touch positions when the controller 50 determines that the pinch operation is performed, and a situation in which the detector 30 does not detect the touch by the detection target on the touch position (the first touch position P1) touched immediately before the last touched two touch positions when the controller 50 determines that the pinch operation is performed.

The display device 10 described above with reference to FIGS. 1 to 3 zooms in on or out from the image G through the touch operation performed by the user on three positions. However, it is possible to zoom in on or out from the image G through a touch operation performed by the user on four positions.

Figure 4A:
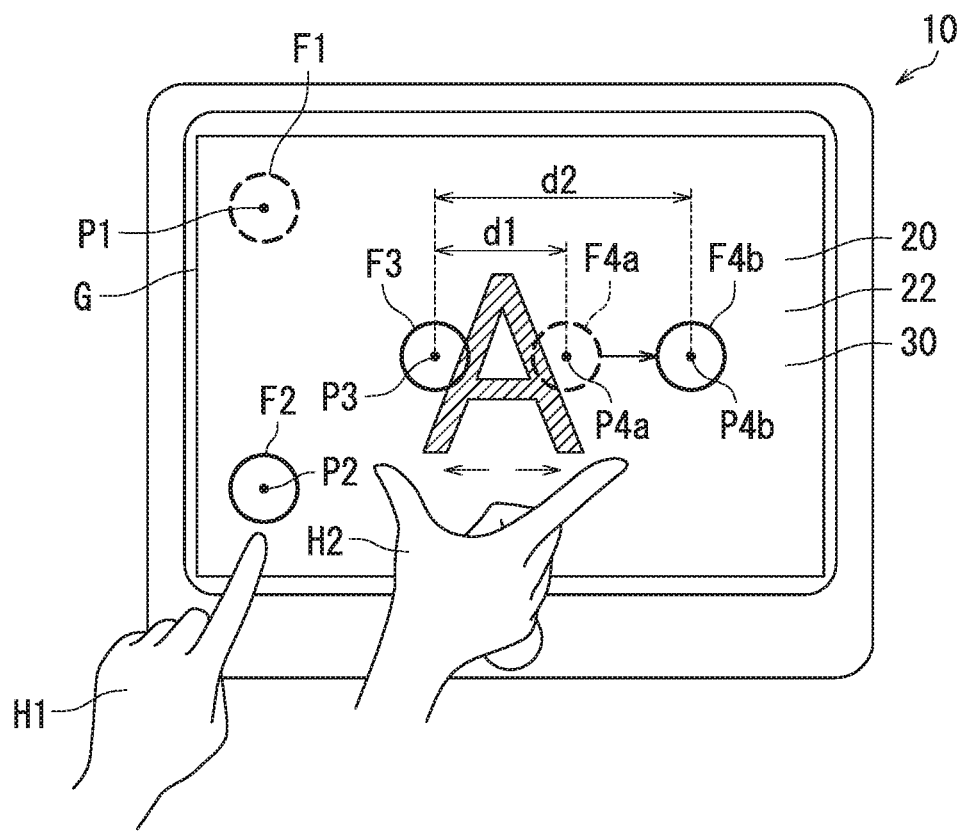
FIGS. 4A and 4B are schematic illustrations of the display device according to the embodiment of the present disclosure.
Figure 4B:
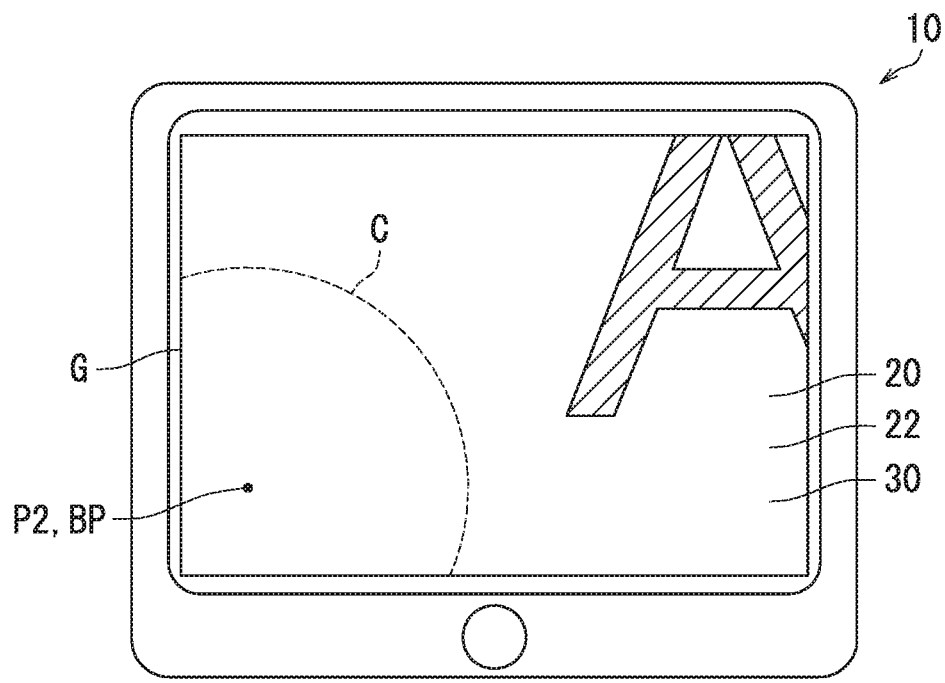
Figure 5:
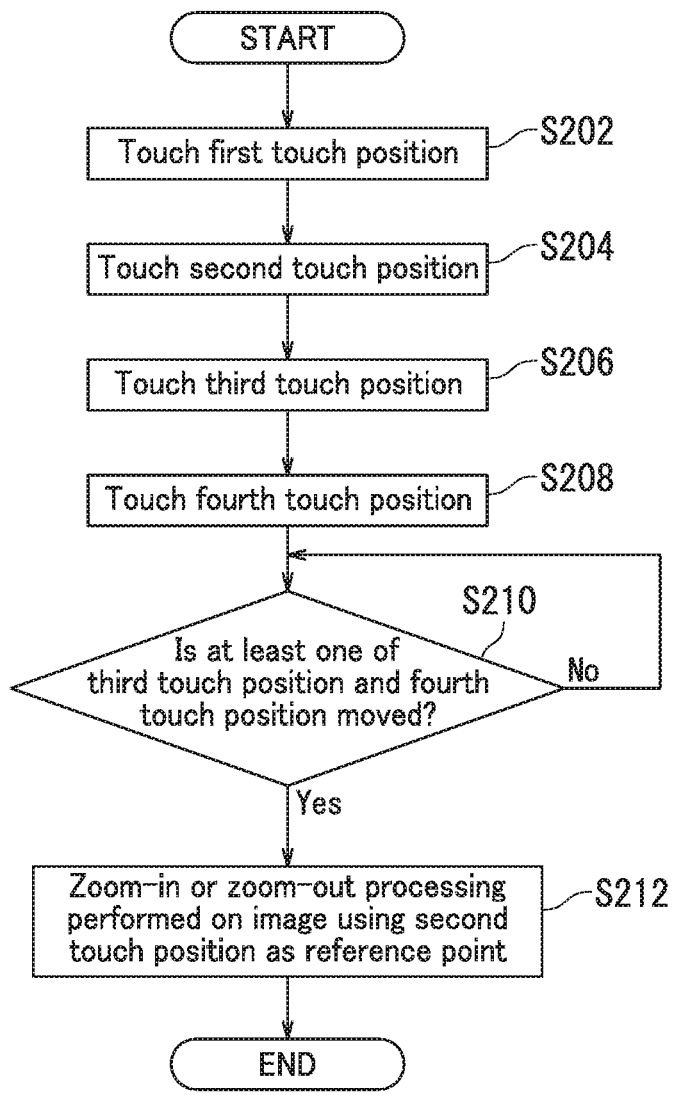
FIG. 5 is a flowchart illustrating a method for performing zoom-in processing or zoom-out processing on an image by the display device according to the embodiment of the present disclosure.

The following describes a method for performing zoom-in processing or zoom-out processing on the image G by the display device 10 according to the embodiment of the present disclosure, with reference to FIGS. 1, 4A, 4B, and 5. FIGS. 4A and 4B are schematic illustrations of the display device 10 according to the embodiment of the present disclosure. FIG. 5 is a flowchart illustrating the method for performing the zoom-in processing or the zoom-out processing on the image G by the display device 10 according to the embodiment of the present disclosure. The zoom-in processing or the zoom-out processing is performed on the image G through execution of steps S202 to S212 illustrated in FIG. 5. The present embodiment describes the zoom-in processing performed on the image G. The method for performing the zoom-in processing or the zoom-out processing on the image G illustrated by the flowchart of FIG. 5 is similar to the method illustrated by the flowchart of FIG. 3 in all aspects other than that the user performs a touch operation on four positions. Therefore, overlapping explanations will be omitted.

At step S202, the user touches a first touch position P1. Specifically, the forefinger of the left hand H1 of the user touches a position F1 as illustrated in FIG. 4A. When the position F1 is touched, the detector 30 detects the first touch position P1. The processing proceeds to step S204.

At step S204, the user touches a second touch position P2. Specifically, as illustrated in FIG. 4A, the user removes the forefinger of the left hand H1 from the position F1 on the display surface 22 and touches a position F2 with the forefinger of the left hand H1. When the position F2 is touched, the detector 30 detects a second touch position P2. The processing proceeds to step S206.

At step S206, the user touches a third touch position P3. Specifically, the thumb of the right hand H2 of the user touches a position F3. When the position F3 is touched, the detector 30 detects the third touch position P3. The processing proceeds to step S208.

At step S208, the user touches a fourth touch position P4. Specifically, the forefinger of the right hand H2 of the user touches a position F4a as illustrated in FIG. 4A. When the position F4a is touched, the detector 30 detects a fourth touch position P4a. The processing proceeds to step S210.

At step S210, the controller 50 determines whether or not at least one of the third touch position P3 and the fourth touch position P4 is moved. Specifically, the controller 50 determines whether or not at least one of the thumb and the forefinger of the right hand H2 of the user is moved. More specifically, the controller 50 determines whether or not a distance between the third touch position P3 and the fourth touch position P4 is changed. When the controller 50 determines that neither the third touch position P3 nor the fourth touch position P4 is moved (No at step S210), that is, when the controller 50 determines that the pinch operation is not performed by the user, the processing returns to step S210. When the controller 50 determines that at least one of the third touch position P3 and the fourth touch position P4 is moved (Yes at step S210), that is, when the controller 50 determines that the pinch operation is performed by the user, the processing proceeds to step S212. For example, in a situation in which the forefinger of the right hand H2 of the user is moved from the position F4a to a position F4b as illustrated in FIG. 4A, the distance between the third touch position P3 and the fourth touch position P4 (P4a, P4b) changes from a distance d1 to a distance d2. Therefore, the controller 50 determines that the pinch operation is performed by the user (Yes at step S210), and the processing proceeds to step S212.

At step S212, the controller 50 performs the zoom-in processing or the zoom-out processing on the image G using the second touch position P2 as a reference point BP. Specifically, the zoom-in processing is performed using the second touch position P2 as the reference point BP as illustrated in FIG. 4B. In the present embodiment, the zoom-in processing or the zoom-out processing is performed on the image G using the second touch position P2 as a center. The zoom-in processing or the zoom-out processing is performed such that the second touch position P2 serves as the center of an imaginary circle C. The imaginary circle C is an image indicating a magnification rate and a zoom-in direction of the zoom-in processing. In the present embodiment, the zoom-in processing is performed such that the second touch position P2 serves as the center of the imaginary circle C.

As described above with reference to FIGS. 1, 4A, 4B, and 5, the controller 50 of the display device 10 determines whether or not the pinch operation is performed on the basis of whether or not a distance between two touch positions (the third touch position P3 and the fourth touch position P4) touched last by the detection target is changed. When the controller 50 determines that the pinch operation is performed, the zoom-in processing or the zoom-out processing is performed on the image G using a touch position (the second touch position P2) touched immediately before the last touched two touch positions (the third touch position P3 and the fourth touch position P4) as the reference point BP. Therefore, the user can change the reference point BP for the zoom-in processing or the zoom-out processing by performing a touch operation again before the pinch operation. Through the above, an area of the image G to be zoomed in or out by the pinch operation can be easily specified.

Figure 6:
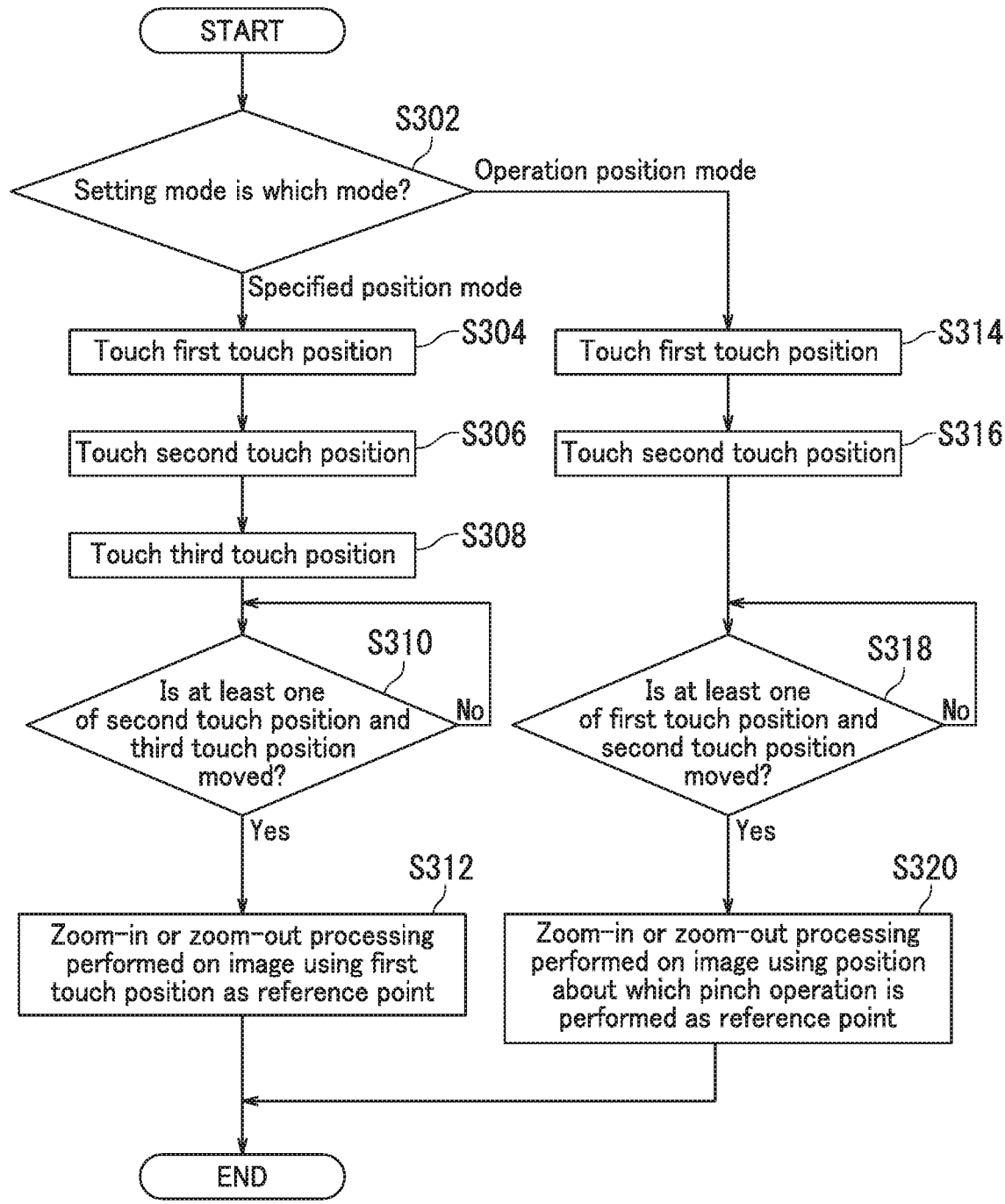
FIG. 6 is a flowchart illustrating a method for performing zoom-in processing or zoom-out processing on an image by the display device according to the embodiment of the present disclosure.
Figure 7A:
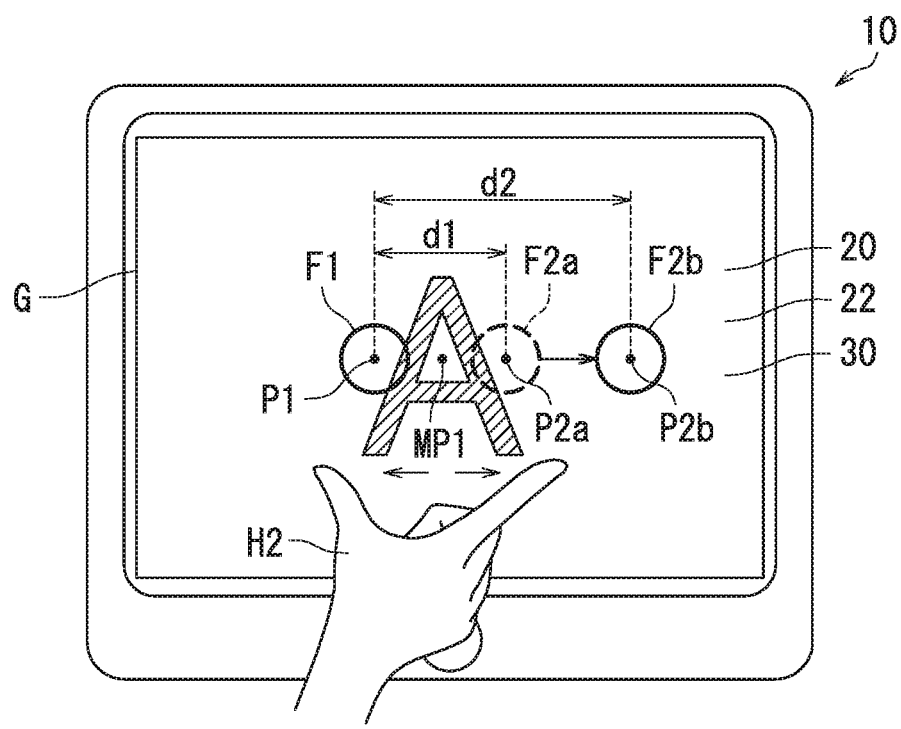
FIGS. 7A and 7B are schematic illustrations of the display device according to the embodiment of the present disclosure.
Figure 7B:
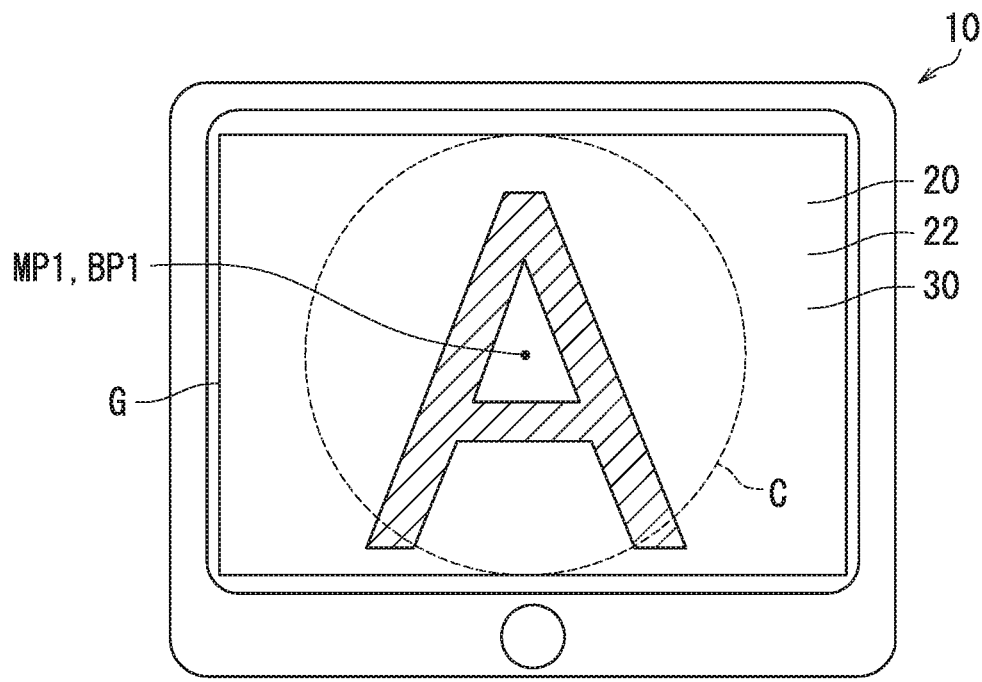

A setting for determining the position of the reference point BP for the zoom-in processing or the zoom-out processing performed on the image G may be changeable according to a setting mode input by the user. The following describes a method for performing zoom-in processing or zoom-out processing on the image G by the display device 10 according to the embodiment of the present disclosure, with reference to FIGS. 1, 6, 7A, and 7B. FIG. 6 is a flowchart illustrating the method for performing the zoom-in processing or the zoom-out processing on the image G by the display device 10 according to the embodiment of the present disclosure. FIGS. 7A and 7B are schematic illustrations of the display device 10 according to the embodiment of the present disclosure. The zoom-in processing or the zoom-out processing is performed on the image G through execution of steps S302 to S320 illustrated in FIG. 6. The present embodiment describes the zoom-in processing performed on the image G. In the method for performing the zoom-in processing or the zoom-out processing on the image G illustrated by the flowchart of FIG. 6, a setting for determining the position of the reference point BP for the zoom-in processing or the zoom-out processing is changed according to a setting mode input by the user. Explanation of aspects of the method illustrated by the flowchart of FIG. 6 overlapping with those of the method illustrated by the flowchart of FIG. 3 will be omitted.

At step S302, the controller 50 recognizes a currently set setting mode. The set mode is stored in the storage 40. The setting mode is input by the user. The setting mode includes a specified position mode and an operation position mode. When the controller 50 recognizes that the currently set setting mode is the operation position mode (Operation position mode at step S302), the processing proceeds to step S314. When the controller 50 recognizes that the currently set setting mode is the specified position mode (Specified position mode at step S302), the processing proceeds to step S304.

At steps S304 to S312, the zoom-in processing or the zoom-out processing is performed on the image G in the same manner as steps S102 to S110 illustrated in FIG. 3 using the first touch position P as the reference point BP. After execution of steps S304 to S312, the processing ends.

At step S314, the user touches a first touch position P1. Specifically, the thumb of the right hand H2 of the user touches a position F1 as illustrated in FIG. 7A. When the position F1 is touched, the detector 30 detects the first touch position P1. The processing proceeds to step S316.

At step S316, the user touches a second touch position P2. Specifically, the forefinger of the right hand H2 of the user touches a position F2a as illustrated in FIG. 7A. When the position F2a is touched, the detector 30 detects the second touch position P2a. The processing proceeds to step S318.

At step S318, the controller 50 determines whether or not at least one of the first touch position P1 and the second touch position P2 is moved. Specifically, the controller 50 determines whether or not at least one of the thumb and the forefinger of the right hand H2 of the user is moved. More specifically, the controller 50 determines whether or not a distance between the first touch position P1 and the second touch position P2 is changed. When the controller 50 determines that neither the first touch position P1 nor the second touch position P2 is moved (No at step S318), that is, when the controller 50 determines that the pinch operation is not performed by the user, the processing returns to step S318. When the controller 50 determines that at least one of the first touch position P1 and the second touch position P2 is moved (Yes at step S318), that is, when the controller 50 determines that the pinch operation is performed by the user, the processing proceeds to step S320. For example, in a situation in which the forefinger of the right hand H2 of the user is moved from the position F2a to a position F2b as illustrated in FIG. 7A, the distance between the first touch position P1 and the second touch position P2 (P2a, P2b) changes from a distance d1 to a distance d2. Therefore, the controller 50 determines that the pinch operation is performed by the user (Yes at step S318), and the processing proceeds to step S320.

At step S320, the controller 50 performs the zoom-in processing or the zoom-out processing on the image G using a position where the pinch operation is performed as a reference point BP. Specifically, the zoom-in processing is performed using a midpoint MP1 as the reference point BP as illustrated in FIG. 7B. The midpoint MP1 is the midpoint between the first touch position P1 and the second touch position P2a. In the present embodiment, the zoom-in processing or the zoom-out processing is performed on the image G using the midpoint MP1 as a center. That is, the zoom-in processing or the zoom-out processing is performed such that the midpoint MP1 serves as the center of an imaginary circle C that is an image indicating a zoom-in direction of the zoom-in processing. In the present embodiment, the zoom-in processing is performed such that the midpoint MP1 serves as the center of the imaginary circle C. The processing ends then. Note that the controller 50 may perform the zoom-in processing or the zoom-out processing on the image G such that either the first touch position P1 or the second touch position P2a serves as the center of the imaginary circle C.

As described above with reference to FIGS. 1, 6, 7A, and 7B, the display device 10 is capable of changing the setting for determining the position of the reference point BP for the zoom-in processing or the zoom-out processing according to a setting mode input by the user. Therefore, an area of the image G to be zoomed in or out can be easily changed according to user's purpose.

Figure 8:
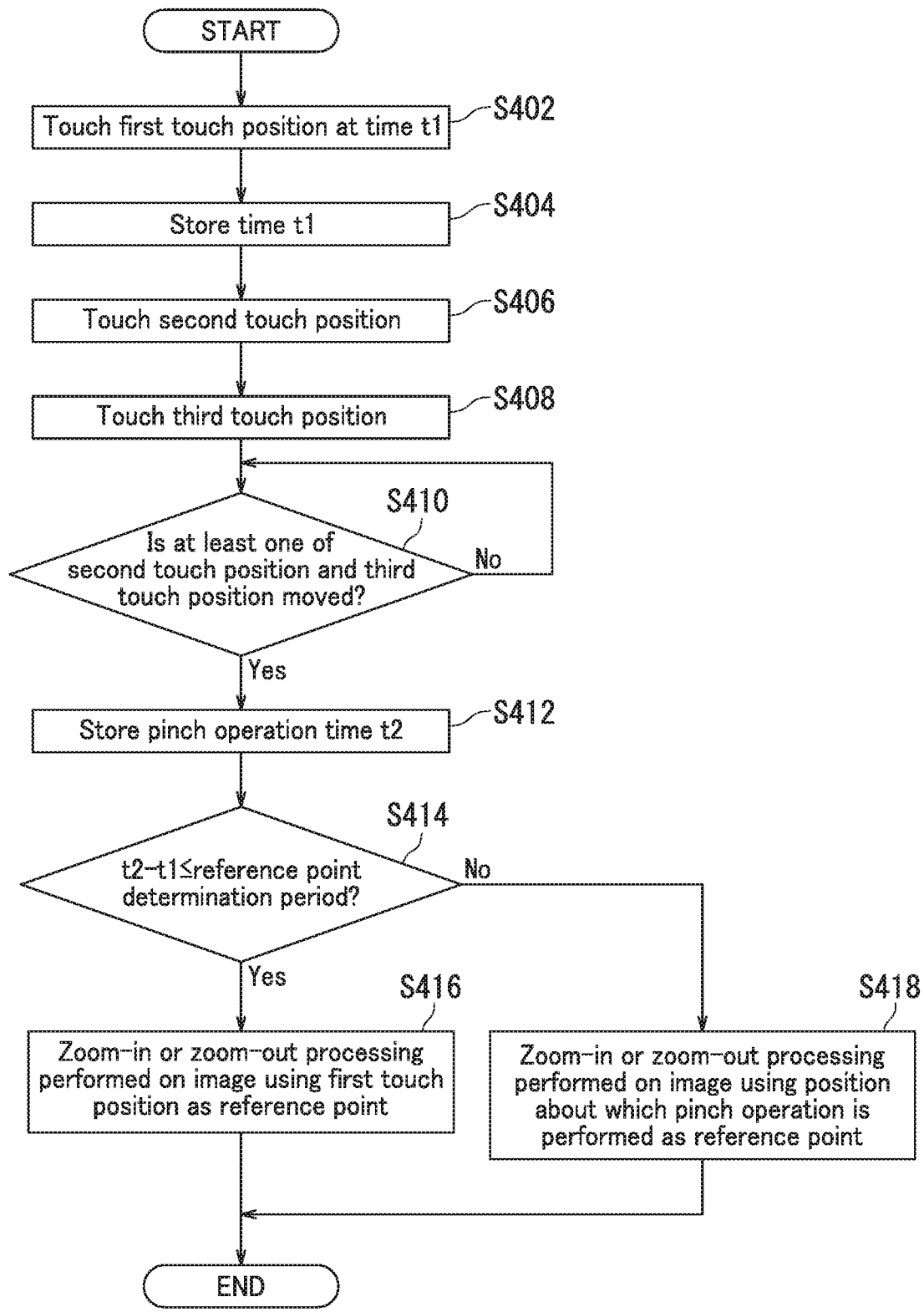
FIG. 8 is a flowchart illustrating a method for performing zoom-in processing or zoom-out processing on an image by the display device according to the embodiment of the present disclosure.

The setting for determining the position of the reference point BP for the zoom-in processing or the zoom-out processing may be changeable depending on timing with which the pinch operation is performed. The following describes a method for performing zoom-in processing or zoom-out processing on the image G by the display device 10 according to the embodiment of the present disclosure, with reference to FIGS. 1, 2A, 2B, and 8. FIG. 8 is a flowchart illustrating the method for performing the zoom-in processing or the zoom-out processing on the image G by the display device 10 according to the embodiment of the present disclosure. The zoom-in processing or the zoom-out processing is performed on the image G through execution of steps S402 to S418 illustrated in FIG. 8. The present embodiment describes the zoom-in processing performed on the image G. In the method for performing the zoom-in processing or the zoom-out processing on the image G illustrated by the flowchart of FIG. 8, the setting for determining the position of the reference point BP for the zoom-in processing or the zoom-out processing is changed depending on timing with which the pinch operation is performed. Explanation of aspects of the method illustrated by the flowchart of FIG. 8 overlapping with those of the method illustrated by the flowchart of FIG. 3 will be omitted.

At step S402, the user touches the first touch position P1 at a time t1. Specifically, the forefinger of the left hand H1 of the user touches the position F1 as illustrated in FIG. 2A. When the position F1 is touched, the detector 30 detects the first touch position P1. The processing proceeds to step S404.

At step S404, the controller 50 stores the time t1 in the storage 40. The processing proceeds to step S406.

At step S406, the user touches the second touch position P2. Specifically, the thumb of the right hand H2 of the user touches the position F2 as illustrated in FIG. 2A. When the position F2 is touched, the detector 30 detects the second touch position P2. The processing proceeds to step S408.

At step S408, the user touches the third touch position P3. Specifically, the forefinger of the right hand H2 of the user touches the position F3a as illustrated in FIG. 2A. When the position F3a is touched, the detector 30 detects the third touch position P3a. The processing proceeds to step S410.

At step S410, the controller 50 determines whether or not at least one of the second touch position P2 and the third touch position P3 is moved. Specifically, the controller 50 determines whether or not at least one of the thumb and the forefinger of the right hand H2 of the user is moved. More specifically, the controller 50 determines whether or not the distance between the second touch position P2 and the third touch position P3 is changed. When the controller 50 determines that neither the second touch position P2 nor the third touch position P3 is moved (No at step S410), that is, when the controller 50 determines that the pinch operation is not performed by the user, the processing returns to step S410. When the controller 50 determines that at least one of the second touch position P2 and the third touch position P3 is moved (Yes at step S410), that is, when the controller 50 determines that the pinch operation is performed by the user, the processing proceeds to step S412. For example, in a situation in which the forefinger of the right hand H2 of the user is moved from the position F3a to the position F3b as illustrated in FIG. 2A, the distance between the second touch position P2 and the third touch position P3 (P3a, P3b) changes from the distance d1 to the distance d2. Therefore, the controller 50 determines that the pinch operation is performed by the user (Yes at step S410), and the processing proceeds to step S412.

At step S412, the controller 50 stores a pinch operation time t2 in the storage 40. The pinch operation time t2 indicates a time when the controller 50 has determined at step S410 that the pinch operation had been performed by the user. The processing proceeds to step S414.

At step S414, the controller 50 determines whether or not a period (a first period) from the time t1 to the time t2 is not longer than a reference point determination period (a threshold period). The reference point determination period is stored in the storage 40. The reference point determination period is for example five seconds. When the controller 50 determines that the period from the time t1 to the time t2 is longer than the reference point determination period (No at step S414), the processing proceeds to step S418. When the controller 50 determines that the period from the time t1 to the time t2 is not longer than the reference point determination period (Yes at step S414), the processing proceeds to step S416.

At step S416, the controller 50 performs the zoom-in processing or the zoom-out processing on the image G using the first touch position P1 as the reference point BP. Specifically, the zoom-in processing is performed using the first touch position P1 as the reference point BP as illustrated in FIG. 2B. In the present embodiment, the zoom-in processing or the zoom-out processing is performed on the image G using the first touch position P1 as a center. That is, the zoom-in processing or the zoom-out processing is performed such that the first touch position P1 serves as the center of an imaginary circle C. The imaginary circle C is an image indicating a magnification rate and a zoom-in direction of the zoom-in processing. In the present embodiment, the zoom-in processing is performed such that the first touch position P1 serves as the center of the imaginary circle C. The processing ends then.

At step S418, the controller 50 performs the zoom-in processing or the zoom-out processing on the image G using a position where the pinch operation is performed as the reference point BP. The processing ends then.

As described above with reference to FIGS. 1, 2A, 2B, and 8, the controller 50 of the display device 10 determines whether or not the first period (the period from the time t1 to the time t2) is not longer than the threshold period (the reference point determination period). The time t1 is when a touch on the touch position (the first touch position P1) touched immediately before the last touched two touch positions is detected. The time t2 is when it is determined that the pinch operation is performed.

When the controller 50 determines that the first period (the period from the time t1 to the time t2) is not longer than the threshold period (the reference point determination period), the zoom-in processing or the zoom-out processing is performed on the image G using the touch position (the first touch position P1) touched immediately before the last touched two touch positions (the second touch position P2 and the third touch position P3) as the reference point BP. That is, when the user performs the pinch operation within the reference point determination period after touching the first touch position P1, the zoom-in processing or the zoom-out processing is performed on the image G using the first touch position P1 as the reference point BP. Therefore, in response to the touch operation and the pinch operation successively performed by the user, the zoom-in processing or the zoom-out processing can be performed on the image G by easily specifying an area of the image G to be zoomed in or out through the zoom-in processing or the zoom-out processing.

By contrast, when the controller 50 determines that the first period (the period from the time t1 to the time t2) is longer than the threshold period (the reference point determination period), the zoom-in processing or the zoom-out processing is performed on the image G using, as the reference point BP, a position where the pinch operation is performed. That is, in a situation in which the touch operation is not performed within the reference point determination period before the pinch operation is performed by the user, the zoom-in processing or the zoom-out processing is performed on the image G using, as the reference point BP, the position where the pinch operation is performed. Therefore, the user can easily specify an area of the image G to be zoomed in or out through the zoom-in processing or the zoom-out processing by performing the pinch operation without specifying the reference point BP by the touch operation.

As described above, the display device 10 is capable of changing the position of the reference point BP for the zoom-in processing or the zoom-out processing depending on timing with which the pinch operation is performed. Therefore, the user can change the setting for determining the position of the reference point BP according to a purpose.

Figure 9:
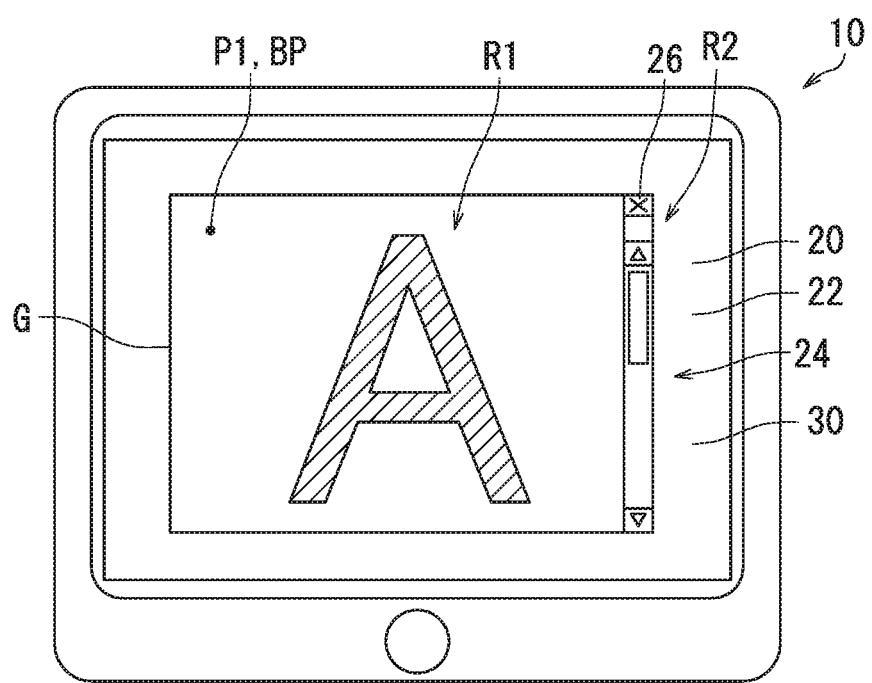
FIG. 9 is a schematic illustration of the display device according to the embodiment of the present disclosure.

The following describes the display device 10 according to the embodiment of the present disclosure with reference to FIGS. 1 and 9. FIG. 9 is a schematic illustration of the display device 10 according to the embodiment of the present disclosure.

As illustrated in FIG. 9, the display surface 22 includes a scalable area R1 and an unscalable area R2. The scalable area R1 includes a scalable image (the image G). The scalable image is the image on which the zoom-in processing or the zoom-out processing is to be performed. The unscalable area R2 includes no scalable image. The unscalable area R2 includes for example a scroll bar 24 and a close button 26. The scroll bar 24 is used to scroll the image G within the scalable area R1. The close button 26 is a button to terminate display of the image G.

The detector 30 detects the touch position (the first touch position P1) touched immediately before the last touched two touch positions within the scalable area R1. Therefore, the user can specify the reference point BP for the zoom-in processing or the zoom-out processing by performing a touch operation within the scalable area R1 before performing the pinch operation. By contrast, when the user performs a touch operation within the unscalable area R2, the detector 30 does not detect the position touched by the user as the touch position touched immediately before the last touched two touch positions. Therefore, even when the user performs a touch operation on the scroll bar 24 or on the close button 26, the controller 50 does not perform the zoom-in processing or the zoom-out processing using the position on which the touch operation is performed as the reference point BP. Through the above, it is prevented that the zoom-in processing or the zoom-out processing is performed using a position determined by user's unintentional touch as the reference point BP.

The controller 50 of the display device 10 described above with reference to FIGS. 2A, 2B, 4A, and 4B performs the zoom-in processing or the zoom-out processing on the image G using the reference point BP as the center. However, it is not required that the reference point BP is the center in the zoom-in processing or the zoom-out processing performed on the image G. For example, the reference point BP may be located upper left of the center in the zoom-in processing or the zoom-out processing performed on the image G.

Figure 10A:
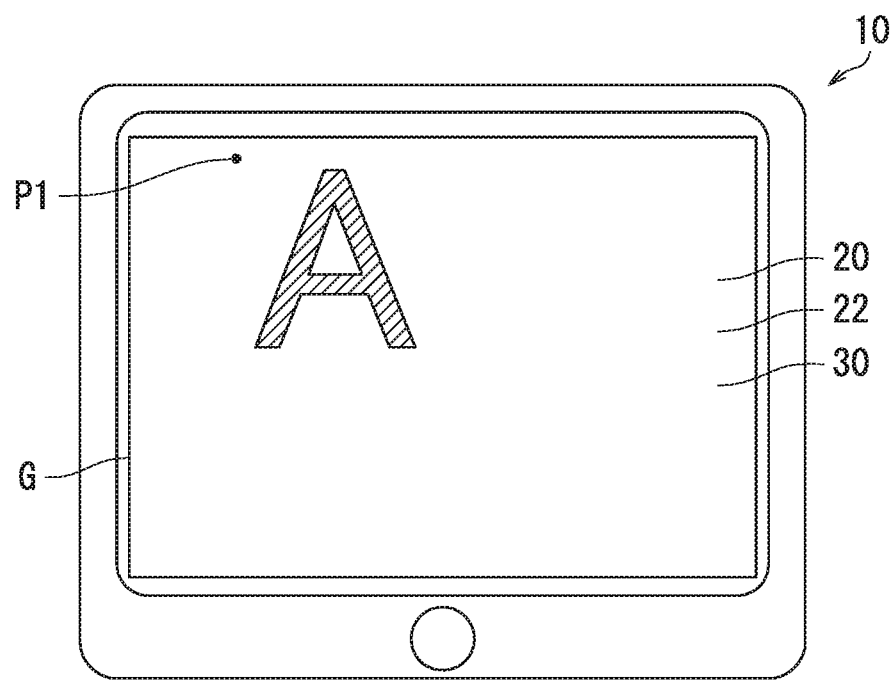
FIGS. 10A and 10B are schematic illustrations of the display device according to the embodiment of the present disclosure.
Figure 10B:
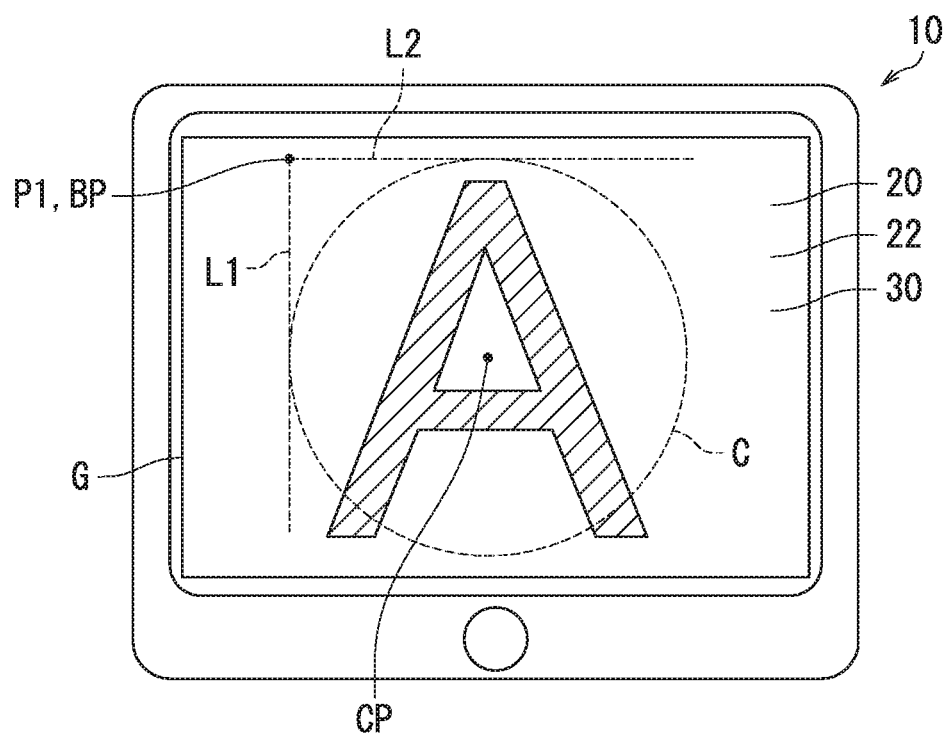

The following describes the display device 10 according to the embodiment of the present disclosure with reference to FIGS. 1, 10A, and 10B. FIGS. 10A and 10B are schematic illustrations of the display device 10 according to the embodiment of the present disclosure. FIG. 10A illustrates the display device 10 before the zoom-in processing is performed on the image G. FIG. 10B illustrates the display device 10 after the zoom-in processing is performed on the image G.

As illustrated in FIG. 10A, in response to a touch operation performed on a position located upper left of the image G, the detector 30 detects a first touch position P1.

Thereafter, a pinch operation is performed to zoom in on the image G as illustrated in FIG. 10B. In the present embodiment, the controller 50 performs the zoom-in processing or the zoom-out processing on the image G such that an intersection point of a tangent L1 and a tangent L2 of an imaginary circle C serves as the reference point BP. That is, the reference point BP is located upper left of the center CP of the imaginary circle C. Therefore, the zoom-in processing on the image G is performed toward the lower right of the reference point BP. As a result, the entirety of the image G representing the character A can be displayed on the display surface 22.

Through the above, the embodiment of the present disclosure has been described with reference to the drawings (FIGS. 1 to 10B). However, the present disclosure is not limited to the above-described embodiment, and is practicable in various manners (for example, as described below in (1) and (2)) within a scope not departing from the gist of the present disclosure. The drawings schematically illustrate elements of configuration in order to facilitate understanding, and properties of elements of configuration illustrated in the drawings, such as lengths and numbers thereof, may differ from actual properties thereof in order to facilitate preparation of the drawings. Properties of elements of configuration described in the above embodiment, such as shapes and dimensions thereof, are merely examples and are not intended as specific limitations. Various alterations may be made within a scope not substantially departing from the effects of the present disclosure.

(1) Although the zoom-in processing performed on the image G by the display device 10 has been described with reference to FIGS. 1 to 10B, it should be noted that similar processing is performed on the image G in the zoom-out processing. That is, when the controller 50 determines that the pinch operation is performed, the zoom-out processing is performed on the image G using the touch position P1 touched immediately before the last touched two touch positions P2 and P3 as the reference point BP. Therefore, the user can specify the reference point BP for the zoom-in processing or the zoom-out processing by performing the touch operation before the pinch operation. Through the above, an area of the image G to be zoomed in or out by the pinch operation can be easily specified.

(2) As described above with reference to FIGS. 1 to 10B, the display device 10 is a smartphone or a tablet computer. However, the present disclosure is not limited to this configuration. For example, the display device 10 may be included in an image forming apparatus.

What is claimed is:

1. A display device comprising:
   a display having a display surface and configured to display an image;
   a detector capable of detecting at least three touch positions each on the basis of a touch on the display surface by a detection target, the detector including a touch sensor; and
   a controller configured to control the display and the detector, the controller including a central processing unit, wherein
   the controller determines whether or not a pinch operation is performed on the basis of whether or not a distance between two touch positions touched last by the detection target is changed,
   when determining that the pinch operation is performed, the controller performs zoom-in processing or zoom-out processing on the image using a touch position touched immediately before the last touched two touch positions as a reference point,
   the controller determines whether or not a first period is not longer than a threshold period, the first period being a period from a time when a touch on the touch position touched immediately before the last touched two touch positions has been detected to a time when it has been determined that the pinch operation is performed,
   when the controller determines that the first period is not longer than the threshold period, the zoom-in processing or the zoom-out processing is performed on the image using the touch position touched immediately before the last touched two touch positions as the reference point, and
   when the controller determines that the first period is longer than the threshold period, the zoom-in processing or the zoom-out processing is performed on the image using a position where the pinch operation is performed as the reference point.

2. The display device according to claim 1, wherein
   the controller performs the zoom-in processing or the zoom-out processing on the image using the touch position touched immediately before the last touched two touch positions as the reference point in both a situation in which the detector continues detecting a touch by the detection target on the touch position touched immediately before the last touched two touch positions when the controller determines that the pinch operation is performed, and a situation in which the detector does not detect a touch by the detection target on the touch position touched immediately before the last touched two touch positions when the controller determines that the pinch operation is performed.

3. The display device according to claim 1, wherein
   in a situation in which the detector continues detecting a touch by the detection target on the touch position touched immediately before the last touched two touch positions when the controller determines that the pinch operation is performed, the zoom-in processing or the zoom-out processing is performed on the image using the touch position touched immediately before the last touched two touch positions as the reference point, and in a situation in which the detector does not detect a touch by the detection target on the touch position touched immediately before the last touched two touch positions, the zoom-in processing or the zoom-out processing is not performed on the image using the touch position touched immediately before the last touched two touch positions as the reference point.

4. The display device according to claim 1, further comprising storage storing therein a setting mode input by a user, wherein the setting mode includes a specified position mode and an operation position mode, when determining that the pinch operation is performed in a situation in which a currently set setting mode is the specified position mode, the controller performs the zoom-in processing or the zoom-out processing on the image using the touch position touched immediately before the last touched two touch positions as the reference point, and when determining that the pinch operation is performed in a situation in which a currently set setting mode is the operation position mode, the controller performs the zoom-in processing or the zoom-out processing on the image using a position where the pinch operation is performed as the reference point.

5. The display device according to claim 1, wherein in performing the zoom-in processing or the zoom-out processing on the image using the position where the pinch operation is performed as the reference point, the zoom-in processing or the zoom-out processing is performed on the image using either of the last touched two touch positions as a center, or the zoom-in processing or the zoom-out processing is performed on the image using a midpoint between the last touched two touch positions as a center.

6. The display device according to claim 1, wherein the controller performs the zoom-in processing or the zoom-out processing on the image using the reference point as a center.

7. The display device according to claim 1, wherein the display surface includes:

a scalable area including a scalable image on which the zoom-in processing or the zoom-out processing is to be performed; and an unscalable area including no scalable image, and the detector detects the touch position touched immediately before the last touched two touch positions within the scalable area.

\* \* \* \* \*